Jan. 22, 1957     W. D. CHAPLIN     2,778,657
TURNTABLE MOUNTINGS FOR TRAILER-TRACTOR FIFTH-WHEELS
Filed Dec. 27, 1954
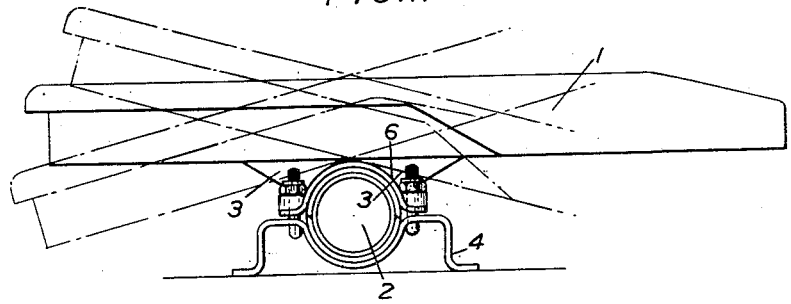
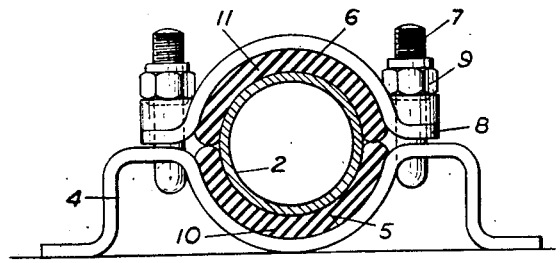
Inventor
WILLIAM D. CHAPLIN

2,778,657

TURNTABLE MOUNTINGS FOR TRAILER-TRACTOR FIFTH-WHEELS

William David Chaplin, Dereham, Norfolk, England, assignor to Cranes (Dereham) Limited, Dereham, England Application December 27, 1954, Serial No. 477,875

3 Claims. (Cl. 280—440)

This invention relates to turntables which form the connection between tractors and semi-trailers of articulated vehicles. These turntables are usually mounted on the tractor chassis and are arranged to engage a king-pin on the semi-trailer to couple the trailer to the tractor.

It is necessary for such turntables to be capable of oscillation when the tractor and trailer are not both on level ground. Hitherto the turntable has been mounted on rocker pins rotatable in bearings and wear takes place at these points. Moreover, the rocker pins and their bearings must be accurately machined.

The present invention provides for the mounting of the turntable so that wear at the rocking points is substantially eliminated, machining of the rocker bearings is made unnecessary and a cushioning action is provided between the turntable and the means by which it is supported.

A turntable for connecting a semi-trailer to a tractor comprising arcuate channel shaped members in which is clamped a tubular member with rubber bushes interposed between the tubular member and the arcuate channel shaped members, the tubular member being fixed to the turntable and the channel members to the tractor or vice versa.

The term "rubber" throughout this specification is intended to include other materials having rubber like properties such as synthetic rubbers.

Other parts of the invention are embodied in the preferred form which will now be described with reference to the accompanying drawings in which:

Fig. 1 is a side view of a turntable, and

Fig. 2 is a section through the mounting to an enlarged scale.

In this form, the turntable 1 is of the known type adapted to engage the king-pin of a semi-trailer to connect it with a tractor. The tubular member 2 is affixed to the underside of the turntable 1, webs 3 being used to strengthen the connection. The tubular member extends across the turntable.

A cross member 4 is fixed to a tractor chassis preferably just ahead of the rear axle. This cross member is of inverted channel section and is formed with a channel 5 in its web of substantially semi-circular shape.

A clamping plate 6, also substantially semi-circular is clamped to the cross member 4 by nuts 9 on bolts 7 passing through the web of the cross member and flanges 8 of the clamping plate.

The tubular member 2 is supported in the channel 5 with an interposed rubber block 10 which in position takes up a semi-circular shape. A similar rubber block 11 is interposed between the clamping plate 6 and the tubular member 2.

It will be seen that the turntable rests in the curved channel 5 of the cross member and is cushioned by the rubber pads which are sufficiently thick to create this cushioning action.

The turntable can oscillate about the axis of the tubular member, the rubber being strained internally. There is no sliding between the members so that there is no sliding friction.

It will also be seen that the assembly obviates machining of rocker bearings and, most important makes a member which is free from wear.

It will be understood that the invention is not restricted to the details of the preferred form which may be modified without departing from the scope of the accompanying claims. For example, the tubular member may be fixed to the tractor and the channel members to the tractor.

I claim:

1. A turntable for connecting a semi-trailer to a tractor comprising an arcuate channel shaped member and a tubular member, one of said members being fixed to the turntable and the other of said members being fixed to the tractor, rubber bushes, and means for clamping said tubular member within the channel shaped member with said rubber bushes interposed therebetween, said rubber bushes comprising two rubber blocks each bent into semi-circular shape by said clamping means.

2. A turntable for connecting a semi-trailer to a tractor comprising a tubular member extending across the turntable, a cross member affixed to the tractor ahead of the rear axle thereof, an arcuate channel formed in said cross member, rubber bushes, and means for clamping said tubular member within said channel with said rubber bushes interposed therebetween, said rubber bushes comprising two rubber blocks each bent into semi-circular shape by said clamping means.

3. A turntable for connecting a semi-trailer to a tractor comprising a tubular member extending across the turntable, a cross member affixed to the tractor ahead of the rear axle thereof, an arcuate channel formed in said cross member, a rubber block interposed between said tubular member and said arcuate channel and bent into semi-circular shape, a clamping plate of semi-cylindrical shape, bolts connecting said clamping plate to said cross member and a rubber bush interposed between said tubular member and said arcuate channel and bent into semi-circular shape by said clamping plate.

References Cited in the file of this patent

UNITED STATES PATENTS

| | | |
|---|---|---|
| 1,552,645 | Powell | Sept. 8, 1925 |
| 2,159,327 | Hendrick | May 23, 1939 |
| 2,513,117 | Stephen | June 27, 1950 |
| 2,543,749 | Walther | Mar. 6, 1951 |
| 2,613,945 | Talbert | Oct. 14, 1952 |